Patented Nov. 3, 1925.

UNITED STATES PATENT OFFICE.

1,560,444

MAX VOLMER, OF HAMBURG, GERMANY.

PROCESS FOR PRODUCING COPPER COATINGS ON NONMETALLIC SUBSTANCES.

No Drawing.  Application filed March 30, 1921.  Serial No. 457,043.

*To all whom it may concern:*

Be it known that I, MAX VOLMER, a citizen of the German Republic, residing at No. 9 Tungiusstr., Hamburg, Germany, have invented certain new and useful Improvements in Processes for Producing Copper Coatings on Nonmetallic Substances, of which the following is a specification.

This invention relates to a process for producing copper coatings on non-metallic substances such as glass, celluloid, etc. The known processes involve troublesome operations and produce satisfactory coatings only with great difficulty. The object of this invention is to remove these drawbacks and this is accomplished by first providing the non-metallic object that is to be coated with copper with a thin diaphanous covering of another metal (such as silver) which is easy to produce, as by separation from solutions.

The new process may also be very successfully employed for the purpose of producing glossy copper coatings or mirrors. To accomplish this a smooth and transparent carrier consisting of a non-metallic substance such as glass is first brought into contact with a silvering liquid of a known kind and then coated with copper in a well known manner as by means of an alkaline copper solution. A very glossy coating will thus be produced which will be formed more or less quickly according to the temperature used. Instances of the production of a copper coating by chemical as distinguished from electrolytic means are found in article of F. D. Chattaway, "Copper Mirrors", Proc. Royal Soc. London, 80 A (1907) pp. 88 to 92, also Chem. News, 97 (1908), pp. 19 to 21, British Patent 152835, and German Patent 124710.

The new process is particularly suitable for producing copper coatings on comparatively large surfaces, such as the inner metallic coating or lining of flasks of the Dewar type, i. e. double-walled vessels in which the space between the walls is evacuated and whose inner surface is lined with metal coatings. It is advantageous to use copper in such vessels, because copper reflects the long-waved heat rays to the same extent as this is done by the more expensive silver which has hitherto generally been employed for this purpose.

After the copper coating or lining has been produced in accordance with the above-described process by means of a coppering solution, this latter is poured out of the vessel and the vessels are then washed and dried. They are then heated and simultaneously the space or jacket between the two walls is evacuated, during which process gases that act as reducing agents, such as hydrogen, methyl alcohol vapor, are employed in the space or jacket formed by the double wall of the vessel. When hydrogen is used the preferred method of procedure is to pump the air out whilst the vessel is heated and to then let in hydrogen and pump it out again, the hydrogen operating to reduce the oxide that may have been formed whilst the vessel was heated. In this way clean copper surfaces are produced that are quite free of oxides and therefore possess the best reflecting qualities that can be obtained. The application of the reducing vapors or gases may take place during the drying process instead of after it, and under certain conditions it will then suffice to introduce indifferent gases whilst the vessel is heated. The presence of the thin coating of silver or equivalent metal facilitates and hastens the subsequent formation of the copper layer by chemical reduction.

To remove any gas residues that lower the vacuum the vessels are heated as described. Up to the present it was necessary to keep the temperature under 250–300° centigrade to prevent the reflecting metallic coating, which always consisted of silver, from being injured. But with a copper coating it is possible to apply much higher temperatures, that is to say, temperatures above 300° centigrade, thus enhancing the certainty that the gas residues, which are deleterious to the vacuum, will be removed. The top limit for the heating of the vessels is the temperature at which the glass, or the glazing in the case of ceramic vessels, begins to soften.

I claim:

1. A process for producing a reflecting copper lining in a double-walled vacuum vessel consisting in first depositing a thin, hardly visible covering of silver on the inner surface of the vessel, producing a copper coating on the said covering, heating the vessel whilst evacuating the space in the double wall, and in subjecting the copper coating to the effect of reducing gases whilst the vessel is heated.

2. A process for producing a reflecting copper lining in a double-walled vacuum vessel consisting in first depositing a thin, hardly visible covering of silver on the inner surface of the vessel, producing a copper coating on the said covering, heating the vessel to a temperature above 300° centigrade whilst evacuating the space in the double wall, and in subjecting the copper coating to the effect of reducing gases whilst the vessel is heated.

3. A process for producing a reflecting copper coating on a non-metallic substance, which consists in first depositing a thin layer of precious metal on such substance, then forming a copper coating on said layer, and subsequently heating said coating in a reducing atmosphere.

4. A process for producing a reflecting copper coating on a non-metallic substance, which consists in first forming a thin layer of precious metal on such substance, then forming a copper coating on said layer, and subjecting said coating while hot to the action of a reducing atmosphere.

In testimony whereof I have signed this specification.

PROF. DR. M. VOLMER.